United States Patent [19]

Miyoshi et al.

[11] Patent Number: 4,582,757

[45] Date of Patent: Apr. 15, 1986

[54] MAGNETIC RECORDING MEDIUM

[75] Inventors: Takahito Miyoshi; Kenichi Masuyama; Masahiro Utumi; Toshimitu Okutu; Masaaki Fujiyama, all of Kanagawa, Japan

[73] Assignee: Fuji Photo Film Co., Ltd., Kanagawa, Japan

[21] Appl. No.: 638,935

[22] Filed: Aug. 9, 1984

[30] Foreign Application Priority Data

Aug. 9, 1983 [JP] Japan .................. 58-145292

[51] Int. Cl.$^4$ ........................... G11B 5/72
[52] U.S. Cl. .................. 428/329; 360/134; 360/135; 360/136; 427/128; 427/131; 428/329; 428/330; 428/408; 428/694; 428/900
[58] Field of Search .......... 428/694, 695, 403, 407, 428/408, 900, 323, 329, 330; 427/44, 130, 131, 128; 252/62.54; 360/134-136

[56] References Cited

U.S. PATENT DOCUMENTS

| | | | |
|---|---|---|---|
| 4,135,031 | 1/1979 | Akashi | 428/694 |
| 4,310,599 | 1/1982 | Akashi | 428/694 |
| 4,414,270 | 11/1983 | Miyoshi | 428/694 |
| 4,419,406 | 12/1983 | Isobe | 428/694 |
| 4,451,531 | 5/1984 | Isobe | 428/694 |
| 4,452,863 | 6/1984 | Takizawa | 428/694 |
| 4,474,843 | 10/1984 | Miyoshi | 428/694 |

*Primary Examiner*—Ellis P. Robinson
*Attorney, Agent, or Firm*—Sughrue, Mion, Zinn, Macpeak and Seas

[57] ABSTRACT

A magnetic recording medium which comprises a non-magnetic support having on the surface side thereof a magnetic recording layer and on the opposite side thereof a backing layer having a thickness of 2 μm or less, which contains carbon black and a binder and optionally, an inorganic powder, in which the backing layer contains at least two kinds of carbon black, one being fine-grained carbon black having a mean grain size of 10 to 30 mμ and the other being coarse-grained carbon black having a mean grain size of 150 to 500 mμ such that the weight ratio (P/B) of the total amount of carbon black and inorganic powder (P) to binder (B) is from about 1/0.5 to 1/3.5. The recording medium described provided smooth and stable tape-running for an extended period and a high S/N ratio.

13 Claims, No Drawings

MAGNETIC RECORDING MEDIUM

FIELD OF THE INVENTION

The present invention relates to a magnetic recording medium and particularly, to a magnetic recording medium having excellent electromagnetic properties, a small coefficient of friction and good running durability.

BACKGROUND OF THE INVENTION

In recent years, high density recording media have been increasingly employed in magnetic tapes for general use, e.g., for audio recording, video recording and, computer applications. To provide high density recording media for such applications, more finely grained conventional Co-containing magnetic iron oxides have been used.

In addition, ferromagnetic alloy powders can be used, as well as ferromagnetic metal thin film magnetic recording media which are formed using vapor deposition methods such as vacuum evaporation, sputtering, or ion plating. These media have recently attracted considerable attention, and are now in practical use.

In high-density magnetic tapes for audio, video or computer applications, the surface of the magnetic layer is smoothed in order to improve sensitivity (i.e., output, particularly in the high frequency region). On the other hand, for various purposes, e.g., imparting antistatic property, a backing layer is provided on the opposite side of a non-magnetic support to the side where the magnetic layer is provided. For example, a backing layer containing carbon black is described in U.S. Pat. No. 4,310,599. When the magnetic layer is finished so as to have a smooth surface, however, the improvement in sensitivity is limited due to the roughness of the backing layer.

In addition, it is desirable to produce magnetic tapes having the least possible total thickness, and in many cases magnetic tapes have a thickness of only about 20 $\mu$m or less.

With the reduction of the total thickness, the backing layer of such tapes is also reduced, often to a thickness of 2 $\mu$m or less. However, such a thin backing layer tends to be pared.

The reduction in total thickness of such magnetic tapes has the disadvantage that mechanical strength of the magnetic tape is reduced, accompanied by poor running durability, winding characteristics, and output fluctuation.

SUMMARY OF THE INVENTION

A primary object of the present invention is to provide a magnetic recording medium free from increase in coefficient of friction and paring, which permits a long life and smooth and has stable running characteristics.

Another object of the present invention is to provide a magnetic recording medium having a backing layer which does not impair the signal to noise ratio of the magnetic layer, and which is suitable for both coating type magnetic tape and magnetic tape of metal thin film type.

The above-described objects are attained with a magnetic recording medium which comprises a non-magnetic support having on the surface side thereof a magnetic recording layer and on the opposite side thereof a backing layer having a thickness of 2 $\mu$m or less which contains at least fine grained carbon black having a mean grain size of 10 to 30 m$\mu$ and coarse-grained carbon black having a mean grain size of 150 to 500 $\mu$m, an optional inorganic powder and a binder such that the ratio (P/B) of the total amount of carbon black and inorganic powder (P) to binder (B) is from about 1/0.5 to 1/3.5 by weight.

DETAILED DESCRIPTION OF THE INVENTION

In the present invention, the fine-grained carbon black preferably has a mean grain size of 15 to 25 m$\mu$ and the coarse-grained carbon black preferably has a mean grain size of 150 to 350 $\mu$m.

In the backing layer of the magnetic recording medium according to the invention the fine-grained carbon black having a size of 10 to 30 m$\mu$ and coarse-grained carbon black having a size of 150 to 500 m$\mu$ are used in a ratio of about 99.5/0.5 to 60/40, and preferably about 99/1 to 80/20.

The fine-grained carbon black having a size of 10 to 30 m$\mu$ included lowers the surface electric resistance of the backing layer and further, contributes to reducing the permeability of light to a low level, each of which considerably improves coating type magnetic tapes, particularly VHS type video tapes. In addition, the fine-grained carbon black having a size of 10 to 30 m$\mu$ retains for a long period lubricant transferred from the magnetic layer upon winding of the tape, or lubricant included in the backing layer, either by application of an overcoat or mixed with the other original constituents, thereby contributing to a reduced coefficient of friction.

The coarse-grained carbon black having a size of 150 to 500 m$\mu$ included in the backing layer functions as a solid lubricant. Addition of carbon black of this particle size greatly enhances the running durability of a magnetic tape, and more particularly, sharply decreases the coefficient of friction.

Specific examples of fine-grained carbon black and coarse-grained carbon black which can be advantageously employed in the present invention are set forth in Table 1.

TABLE 1

| Trade Name | Mean Grain Size (m$\mu$) | Maker |
| --- | --- | --- |
| Asahi #80 | 23 | Asahi Carbon Co.,Ltd. |
| Asahi #70 | 27 | Asahi Carbon Co.,Ltd. |
| Seast 6H | 24 | Tokai Electrode Mfg. Co., Ltd. |
| Seast 6 | 24 | Tokai Electrode Mfg. Co., Ltd. |
| Seagal 600 | 23 | Tokai Electrode Mfg. Co., Ltd. |
| Seast 5H | 26 | Tokai Electrode Mfg. Co., Ltd. |
| Seast 3H | 28 | Tokai Electrode Mfg. Co., Ltd. |
| Seast 3 | 28 | Tokai Electrode Mfg. Co., Ltd. |
| Seast H | 28 | Tokai Electrode Mfg. Co., Ltd. |
| Seagal 300 | 27 | Tokai Electrode Mfg. Co., Ltd. |
| Seast 116 | 30 | Tokai Electrode Mfg. Co., Ltd. |
| Diablack A | 18 | Mitsubishi Chemical Industrial Ltd. |
| Diablack I | 21 | Mitsubishi Chemical Industrial Ltd. |
| Diablack II | 23 | Mitsubishi Chemical Industrial Ltd. |
| Diablack H | 30 | Mitsubishi Chemical Industrial Ltd. |
| Diablack SH | 30 | Mitsubishi Chemical |

TABLE 1-continued

| Trade Name | Mean Grain Size (mµ) | Maker |
| --- | --- | --- |
| Conductex SC | 17 | Industrial Ltd. Columbian Carbon Co. |
| Ravan MTP | 280 | Columbian Carbon Co. |

The backing layer of the present invention may contain carbon black having a size of more than 30 mµ but less than 150 mµ as long as the effect of the present invention is not deteriorated, but the amount of such carbon black should be less than 50 wt% based on the total amounts of carbon black included.

It is preferred that the backing layer of the present invention have a smooth surface, i.e., a center line average roughness, Ra, of 0.024 µm or less when cutoff value is 0.08 mm. By this means, roughness in the magnetic layer caused by roughness in the backing layer is prevented.

Optical inorganic powders can be added to the backing layer of the present invention along with the carbon black in order to improve running properties. Suitable inorganic powders include $CaCO_3$, ZnS, $MgCO_3$, ZnO, $TiO_2$, $Fe_3O_4$, $SnO_2$, $SiO_2$, $Cr_2O_3$, $\alpha\text{-}Al_2O_3$, SiC and so on. Of these inorganic powders, $CaCO_3$, $TiO_2$, $SnO_2$, $Cr_2O_3$, $\alpha\text{-}Al_2O_3$ and the like are more preferred. The particle size of inorganic powders is not particularly limited, but it is preferably 0.02 to 2.0 µm and more preferably 0.07 to 1.2 µm.

Such inorganic powders are preferably added in an amount of from 0 to 10 parts by weight, more preferably 0.1 to 5.0 parts by weight, and more preferably 0.1 to 3.0 parts by weight, per 100 parts by weight of carbon black.

Binders which can be employed for the backing layer of the present invention are not unduly limited, and may be freely selected from those well known in the art, including thermoplastic resins, thermosetting resins, reactive resins and the mixtures of two or more thereof. These binders are described, for example, in U.S. Pat. No. 4,367,261. In a preferred embodiment, the binder or combination of binders used has a glass transition temperature (Tg) of about 40° C. or above, more preferably of about 60° C. or above.

Specific examples of thermoplastic resins which have a suitable Tg include vinyl chloride-vinyl acetate copolymers, vinyl chloride-vinylidene chloride copolymers, vinyl chlorideacrylonitrile copolymers, acrylic acid ester-acrylonitrile copolymers, acrylic acid ester-vinylidene chloride copolymers, acrylic acid ester-styrene copolymers, methacrylic acid esteracrylonitrile copolymers, methacrylic acid ester-vinylidene chloride copolymers, methacrylic acid ester-styrene copolymers, urethane elastomers, polyvinyl fluoride, vinylidene chlorideacrylonitrile copolymers, butadiene-acrylonitrile copolymers, polyamide resins, polyvinyl butyral, cellulosic resins (e.g., cellulose acetate butyrate, cellulose diacetate, cellulose propionate, nitrocellulose, etc.), styrene-butadiene copolymers, polyester resins, chlorovinyl ether-acrylic acid ester copolymers, amino resins, and various rubber resins.

Specific examples of thermosetting resins or reactive resins which can be employed include phenol resins, epoxy resins, hardenable polyurethane resins, urea resins, melamine resins, alkyd resins, reactive acryl resins of polyisocyanates, and polyamides.

When the total amount of carbon black and inorganic powders is represented by P, and the amount of binder is represented by B, the P/B ratio according to the invention is from about 1/0.5 to 1/3.5, preferably from about 1/0.5 to 1/3.0, and more preferably from about 1/0.8 to 1/2.0. In the high S/N ratio magnetic tape of the present invention, it is necessary to limit the carbon black content in the magnetic layer, and therefore the backing layer serves the important function of reducing the surface electric resistance.

If carbon black is incorporated in the binder in an amount exceeding the above-described limits carbon black tends to ooze out on the surface of the backing layer and to be removed, while if it is incorporated in an insufficient amount, the coefficient of friction increases undesirably.

The backing layer of the present invention may also include lubricants conventionally used in magnetic tapes, which may be incorporated as constituents of the backing layer or provided on the backing layer as an overcoat. In particular, incorporation of higher fatty acids having at least 18 carbon atoms or esters thereof is useful to enhance running properties.

The magnetic recording medium of the present invention can be prepared using the materials and the preparation method described in U.S. Pat. No. 4,135,016.

The present invention is described in greater detail by reference to the following examples, but the present invention should not be construed as being limited thereto. All parts ratios and percents are by weight unless otherwise indicated.

EXAMPLE 1

On the surface of a 14 µm-thick polyethylene terephthalate film base was provided a magnetic layer containing Co-doped magnetic iron oxide using the magnetic coating composition shown below, and on the opposite side of the base was provided a backing layer in a dry thickness of 1 µm using the coating composition shown below. The mean grain size and amount of carbon black added in the backing layer were varied as described in Table 2, to prepare sample Nos. 1 to 14.

| Magnetic Coating Composition: | |
| --- | --- |
| Co-doped magnetic iron oxide ($S_{BET}$ 35 m$^2$/g) | 100 parts |
| Vinyl chloride-vinyl acetate copolymer ("400 × 110A", produced by Nippon Zeon Co.) | 12 parts |
| Polyurethane ("N-2304", produced by Nippon Polyurethane Co., Ltd.) | 12 parts |
| Polyisocyanate ("Colonate L", produced by Nippon Polyurethane Co., Ltd.) | 12 parts |
| Stearic acid | 1 part |
| Butyl stearate | 1 part |
| Carbon black (mean gain size: 120 mµ) | 5 parts |
| Chromium oxide ($Cr_2O_3$) | 5 parts |
| Methyl ethyl ketone | 300 parts |
| Coating Composition of Backing Layer: | |
| Nitrocellulose | 30 parts |
| Polyurethane ("Nipporane 2301", produced by Nippon Polyurethane Co.,Ltd.) | 15 parts |
| Polyisocyanate ("Colonate L", produced by Nippon Polyurethane Co., Ltd.) | 15 parts |
| Carbon Black Powders | Set forth in Table 2 |
| Inorganic Powder | Set forth in Table 2 |
| Methyl Ethyl Ketone | 480 parts |

EXAMPLE 2

On the surface of a 12 µm-thick polyethylene terephthalate film was provided a magnetic layer made up of Co-Ni alloy (Ni content: 20 wt%) in a thickness of 0.15 μm using an inclined evaporation technique, and on the opposite side of the film was provided a backing layer in the same manner as described in Example 1, having the characteristics described in Table 2. The samples obtained were designated No. 15 to No. 18 respectively.

Each of the thus-obtained samples was tested as follows, and the data determined for the respective samples are set forth in Table 2.

Testing Processes:

(1) $T_2/T_1$ at the first pass and $T_2/T_1$ after the hundredth pass

Under a load of 50 g ($T_1$), applied by a stationary stainless steel rod (4 mm $\phi$) to the backing layer each sample tape was pulled at such a tension ($T_2$) that the tape ran at a speed of 3.3 cm/sec across the stainless rod to determine $T_2/T_1$, which corresponds to the coefficient of dynamic friction of the stainless rod.

The measurement was carried out using a fresh sample tape which had never been run in a VHS tape VTR and the same sample tape after it had been run for 100 passes.

(2) Number of dropouts

The number of dropouts occurring for each sample after 100 passes running was counted at 15 μsec/min using a dropout counter "VD-3D" (made by Victor Company of Japan, Limited).

(3) Color signal-to-noise ratio (Color S/N)

A signal-to-noise measurement was carried out using a noise meter ("925C" produced by Shibasoku Co.), and the difference between the S/N ratio of each test sample and that of a base comparison sample was determined. Sample No. 1 was used as the base sample for sample Nos. 1 to 14, and was assigned an S/N ratio of 0 dB. Sample No. 15 was used as the base sample for sample Nos. 15 to 18, and was assigned a S/N ratio of 0 dB.

In the measurement, a high bass filter of 10 KHz and a low pass filter of 500 KHz AM were used. The VTR used was "NV-8300" produced by Matsushita Electric Industrial Co.,Ltd.

black having a size of 150 to 500 mμ, and which had the P/B ratio in the range of 1/0.5 to 1/3.5.

While the invention has been described in detail and with reference to specific embodiments thereof, it will be apparent to one skilled in the art that various changes and modifications can be made therein without departing from the spirit and scope thereof.

What is claimed is:

1. A magnetic recording medium which comprises a non-magnetic support having on the surface side thereof a magnetic recording layer and on the opposite side thereof a backing layer having a thickness of about 2 μm or less, which contains at least fine-grained carbon black having a mean grain size of about 10 to 30 mμ and coarse-grained carbon black having a mean grain size of about 150 to 500 mμ and a binder such that the ratio (P/B) of the total amount of carbon black (P) to binder (B) is from about 1/0.5 to 1/3.5 by weight.

2. The magnetic recording medium claimed in claim 1, wherein said fine-grained carbon black and said coarse-grained carbon black are present in a ratio of about 99.5/0.5 to 60/40.

3. The magnetic recording medium claimed in claim 2, wherein said ratio of fine-grained carbon black to coarse-grained carbon black is from about 99/1 to 80/20.

4. The magnetic recording medium claimed in claim 1, wherein said fine-grained carbon black has a mean grain size of from about 15 to 25 mμ and said coarse-grained carbon black has a mean grain size of from about 150 to 350 mμ.

5. The magnetic recording medium claimed in claim 1, wherein said ratio of carbon black (P) to binder (B) is from about 1/0.5 to 1/3.0.

6. The magnetic recording medium claimed in claim 5, wherein the ratio of carbon black (P) to binder (B) is from about 1/0.8 to 1/2.0.

7. The magnetic recording medium claimed in claim 1, wherein said inorganic powder is selected from the group consisting of $CaCO_3$, $TiO_2$, $SnO_2$, $Cr_2O_3$, and $\alpha$-$Al_2O_3$.

TABLE 2

| Sample No. | Carbon Black (parts) | | | | | Inorganic Powder | | P/B | $T_2/T_1$ at first pass | $T_2/T_1$ After 100 Passes Running | Number of Dropouts (15 μs) (per min) | Initial Color S/N (dB) |
|---|---|---|---|---|---|---|---|---|---|---|---|---|
| | Conductex SC (17 mμ) | Asahi #80 (23 mμ) | Asahi #60 (51 mμ) | Asahi #35 (116 mμ) | Raven MT-P (280 mμ) | Kinds | Amount (parts) | | | | | |
| 1 | 40 | — | — | — | — | | | 1/1.5 | 2.0 | 3.5 | 10 | 0 |
| 2 | — | — | 40 | — | — | | | 1/1.5 | 1.9 | 2.2 | 8 | −1.0 |
| 3 | — | — | — | 40 | — | | | 1/1.5 | 1.7 | 1.8 | 8 | −1.5 |
| 4 | — | — | — | — | 40 | | | 1/1.5 | 1.7 | 1.7 | 10 | −1.7 |
| 5 | 54 | — | — | 6 | — | | | 1/1 | 1.8 | 2.0 | 7 | −0.2 |
| 6 | — | 54 | — | 6 | — | | | 1/1 | 1.8 | 2.0 | 7 | −0.2 |
| 7 | 135 | — | — | — | 15 | | | 1/0.4 | 1.7 | 1.7 | 25 | −0.5 |
| 8 | 90 | — | — | — | 10 | | | 1/0.6 | 1.7 | 1.7 | 4 | 0 |
| 9 | 15 | — | — | — | 1.5 | | | 1/3.6 | 1.8 | 2.2 | 5 | 0 |
| 10 | 16 | — | — | — | 1.5 | | | 1/3.4 | 1.7 | 1.9 | 3 | 0 |
| 11 | 37 | — | — | — | 3 | | | 1/1.5 | 1.7 | 1.8 | 3 | 0 |
| 12 | 36 | — | — | — | 3 | $Cr_2O_3$ | 1 | 1/1.5 | 1.7 | 1.7 | 2 | 0 |
| 13 | — | 36 | — | — | 3 | $\alpha$-$Al_2O_3$ | 1 | 1/1.5 | 1.7 | 1.7 | 2 | 0 |
| 14 | 54 | — | — | — | 6 | | | 1/2 | 1.7 | 1.8 | 3 | 0 |
| 15 | 40 | — | — | — | — | | | 1/1.5 | 2.1 | 3.6 | 15 | 0 |
| 16 | — | — | — | — | 40 | | | 1/1.5 | 1.7 | 1.8 | 10 | −2.5 |
| 17 | — | 27 | — | 3 | — | | | 1/2 | 1.8 | 2.0 | 5 | 0 |
| 18 | 37 | — | — | — | 3 | | | 1/1.5 | 1.7 | 1.8 | 2 | 0 |

As can be clearly seen from the results in Table 2, especially good results were obtained only when using the backing layer according to the invention, which contained fine-grained carbon black having a size of 10 to 30 mμ in combination with coarse-grained carbon 8. The magnetic recording medium as claimed in claim 7, wherein said inorganic powder is present in an amount of from about 0 to 10 parts by weight per 100 parts by weight of carbon black.

9. The magnetic recording medium as claimed in claim 8, wherein said inorganic powder is present in an amount of from 0.1 to 5.0 parts by weight per 100 parts by weight of carbon black.

10. The magnetic recording medium as claimed in claim 9, wherein said inorganic powder is present in an amount of from 0.1 to 3.0 parts by weight per 100 parts by weight of carbon black.

11. The magnetic recording medium as claimed in claim 1, wherein said magnetic recording layer is a high density recording layer comprising a Co-containing magnetic iron oxide, a ferromagnetic alloy powder, or a ferromagnetic metal thin film.

12. The magnetic recording medium claimed in claim 1, wherein said backing layer has a center line average roughness Ra of 0.024 μm or less when cutoff value is 0.08 mm.

13. The magnetic recording medium claimed in claim 1 wherein said backing layer also contains an inorganic powder.

* * * * *